Patented Feb. 18, 1941

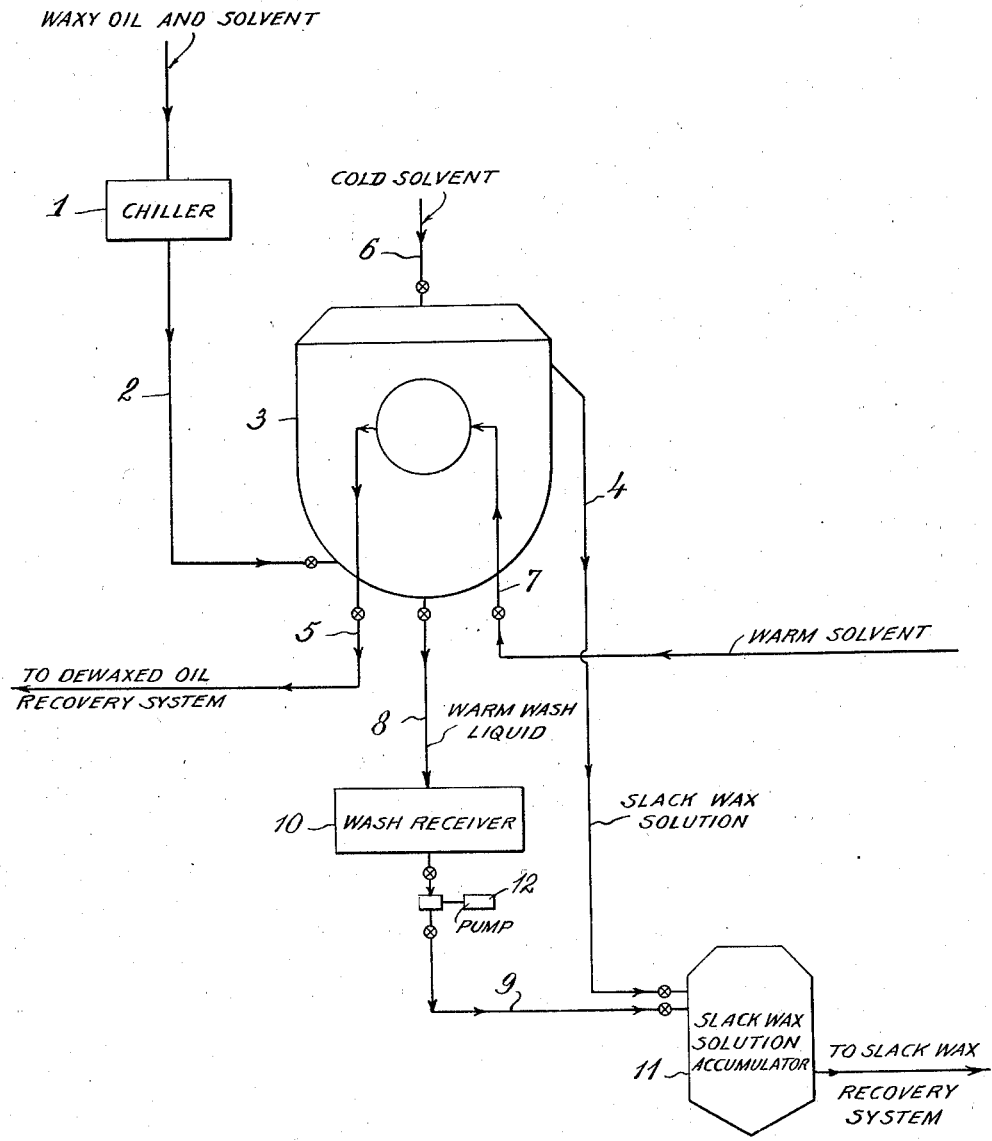

2,232,603

UNITED STATES PATENT OFFICE 2,232,603

SOLVENT DEWAXING

Henry Harrell Hardin, Beaumont, Tex., assignor to Socony-Vacuum Oil Company, Incorporated, New York, N. Y., a corporation of New York Application June 9, 1939, Serial No. 278,255

3 Claims. (Cl. 196—17)

This invention relates to the dewaxing of petroleum oils. More particularly the invention relates to an improvement in the method of recovering oil and wax from the wash solvent used for cleaning the filters of a petroleum solvent dewaxing plant.

As is well known in the solvent dewaxing of petroleum oils a suitable solvent or solvent mixture is added to the oil whereupon the oil is chilled to precipitate wax and then filtered to remove the precipitated wax from the oil. The slack wax removed by the filter, which is a mixture of wax and oil in variable proportions, is sent to suitable slack wax recovery system for removing solvent from slack wax. The dewaxed oil filtrate is also sent to suitable columns for removing solvent from the wax-free oil.

After solvent dewaxing filters have been in operation for sometime the filter cloth becomes plugged or clogged with wax which must be removed. In removing this wax from the filter cloth the filter is taken out of operation and solvent, which is usually the same solvent as used for dewaxing, is run through the filter in a heated condition. This used wash solvent liquor contains wax and oil removed from the filter cloth which may be recovered.

Heretofore the general practice for recovering the wax and oil from the used wash solvent liquor comprised adding the used wash liquor to the fresh feed oil to be dewaxed before sending the feed oil to the chiller.

It is an object of this invention to provide an improved method for recovering wax and oil from solvent wash liquor which has been used for cleaning solvent dewaxing filters.

A more specific object is to provide a method for recovering wax and oil from solvent wash liquor which has been used for cleaning solvent dewaxing filters which permits greater throughput and total production of dewaxed oil than the processes now enjoyed by the art.

My invention comprises recovering wax and oil from used wash solvent liquor from a petroleum solvent dewaxing filter by adding the used liquor to the slack wax removed by said filter prior to the removal of solvent from the slack wax. Thus contrary to the prior art, which adds the wash solvent liquor to the dewaxing system at points prior to the filtering, my invention comprises adding the wash solvent liquor to the dewaxing system at certain points after the filtering.

My invention will be more fully described in connection with the accompanying drawing which is a diagrammatic flow sheet showing a suitable arrangement of apparatus for carrying out the present invention.

In the drawing the oil to be dewaxed, to which has been added a dewaxing solvent, is passed into chiller 1 to precipitate the wax. Oil and solvent solution containing the precipitated wax passes from chiller through line 2 to filter 3. While the filter may be of other known designs wherein the filter cloth becomes plugged with wax and must be washed, it is represented in the drawing as a conventional rotary drum filter. In the rotary drum filter 3, a wax cake is built up on the revolving drum and removed through line 4. The dewaxed oil filtrate is removed through line 5 from the central portion of the drum. During the filtering operation, it is customary to wash the wax cake as it builds up on the rotating drum before it is removed by gently spraying with cold solvent. Cold solvent for this purpose may be introduced through line 6. The filtered wax containing solvent and oil which is removed through line 4 and collected in accumulator 11 is sent to a suitable system (not shown) for removing the solvent and oil from the wax in known manner. For instance, the solvent may be removed in suitable columns and the oil removed by sweating or by a suitable solvent deoiling operation. Likewise the dewaxed oil containing solvent removed through line 5 may be sent to a suitable system of columns (not shown) for removing solvent from the dewaxed oil in known manner.

When the filter cloth of filter 3 becomes plugged with wax which must be removed, the flow of oil through line 2 is stopped and warm solvent is passed into filter 3 through line 7 and drawn off through line 8. The used wash solvent liquor drawn off through line 8 contains a substantial amount of wax and oil and is first accumulated in wash receiver 10. In accordance with my invention, this wax and oil is recovered by passing the used wash liquor accumulated in wash receiver 10 through line 9 into the slack wax solution accumulator 11 and then sent along with the slack wax to the wax recovery system.

While in the drawing I have shown passing the used wash solvent liquor into a slack wax accumulator in line 4, it is to be understood that this used wash liquor may be sent to any point in the slack wax recovery system prior to the removal of solvent as, for example, to a slack wax surge tank or directly to one of the columns for recovering solvent from the wax. A pump 12 may be provided at wash receiver 10 for effecting transfer of the used wash liquor to any desired point in the slack wax recovery system.

The advantages of the present method of operation may be seen from the following data, wherein the results of my method of operation are compared with that of a conventional operation in which the wash solvent liquor is returned to the fresh feed oil being sent to the chillers.

|  | Present method | Conventional operation |
|---|---|---|
| Charge oil | Waxy bright stock | Waxy bright stock |
| Charge rate, bbls.*/day | 2496 | 2250 |
| Yield dewaxed oil percent vol | 87 | 88 |
| Dewaxed oil bbls.*/day | 2172 | 1980 |

*42 gallon barrels.

Although a slight decrease in the yield of dewaxed oil from the waxy charge oil is suffered, it will be noted from the above data that a substantial increase in throughput and total production of dewaxed oil is obtained by the present process. It has been found that the waxes contained in the used solvent wash liquor lower the rate of filtration per unit area of filtering surface. The improved throughput and total production of dewaxed oil obtained by my process is believed attributable to the advantage gained in operation by not returning the waxes which have the property of plugging the filter cloths to the fresh waxy feed oil.

My process is particularly applicable to operations for dewaxing heavy petroleum oils to remove residual waxes (petrolatum) which are not further processed into refined waxes and therefore are not particularly undesirable because of a relatively high oil content.

I claim:

1. In a solvent dewaxing process which comprises chilling a wax bearing petroleum oil and solvent mixture to precipitate wax, passing the mixture through a filter to filter the oil from the wax, continuously removing a slack wax from the filter during filtering, recovering solvent from the slack wax, and periodically stopping said filtering operation and passing wash solvent through the filter to wash out wax remaining therein, the improvement which comprises recovering the wax removed from said filter by said wash solvent by mixing the used wash solvent containing wax with said slack wax, prior to removal of associated solvent from said slack wax, and removing solvent from this latter mixture.

2. In a solvent dewaxing process which comprises chilling a wax bearing petroleum oil and solvent mixture to precipitate wax, filtering the wax from the oil in a rotary drum filter, recovering associated solvent from the wax filtered out from said oil by passing said filtered out wax to suitable columns to remove solvent and wherein said filtering operation is periodically stopped as the rotary drum filter cloth becomes plugged with wax and warm wash solvent is passed through the filter to wash wax and oil from the filter cloth, the improvement which comprises recovering the wax and oil removed from said filter cloth by said warm wash solvent by mixing the used wash solvent containing wax and oil with said wax filtered out of said oil, prior to removal of associated solvent from said filtered out wax in said columns, and removing solvent from this latter mixture.

3. In a solvent dewaxing process which comprises chilling a heavy petroleum oil containing petrolatum and solvent mixture to precipitate petrolatum, filtering the petrolatum from the oil in a rotary drum filter, recovering associated solvent and oil from the petrolatum filtered out from said oil by passing said filtered out petrolatum to suitable columns to remove solvent and wherein said filtering operation is periodically stopped as the rotary drum filter cloth becomes plugged with petrolatum and warm wash solvent is passed through the filter to wash petrolatum and oil from the filter cloth, the improvement which comprises recovering the petrolatum and oil removed from said filter cloth by said warm wash solvent by mixing the used wash solvent containing petrolatum and oil with said petrolatum filtered out of said oil, prior to removal of associated solvent from said filtered out petrolatum in said columns, and removing solvent from this latter mixture.

HENRY HARRELL HARDIN.